(12) United States Patent
Ikoma et al.

(10) Patent No.: US 11,887,479 B2
(45) Date of Patent: Jan. 30, 2024

(54) PARKING MANAGEMENT SYSTEM, VEHICLE CONTROL DEVICE, AND CONTROL CENTER

(71) Applicant: Hitachi Automotive Systems, Ltd., Hitachinaka (JP)

(72) Inventors: Hirofumi Ikoma, Hitachinaka (JP); Tsutomu Kaneko, Hitachinaka (JP); Koichi Terui, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 540 days.

(21) Appl. No.: 17/056,349

(22) PCT Filed: Apr. 24, 2019

(86) PCT No.: PCT/JP2019/017348
§ 371 (c)(1),
(2) Date: Nov. 17, 2020

(87) PCT Pub. No.: WO2019/225270
PCT Pub. Date: Nov. 28, 2019

(65) Prior Publication Data
US 2021/0217310 A1 Jul. 15, 2021

(30) Foreign Application Priority Data
May 23, 2018 (JP) .................. 2018-098680

(51) Int. Cl.
*G01C 22/00* (2006.01)
*G08G 1/14* (2006.01)
(Continued)

(52) U.S. Cl.
CPC ............. *G08G 1/142* (2013.01); *B60W 30/06* (2013.01); *B60W 60/001* (2020.02); *G01C 21/3407* (2013.01); *G08G 1/143* (2013.01)

(58) Field of Classification Search
CPC ........ G08G 1/142; G08G 1/143; G08G 1/146; B60W 30/06; B60W 60/001;
(Continued)

(56) References Cited

U.S. PATENT DOCUMENTS

2006/0178810 A1* 8/2006 Hashima ................ G01C 21/28
701/532
2017/0285654 A1* 10/2017 Nagai .................. G06Q 10/043
(Continued)

FOREIGN PATENT DOCUMENTS

JP 2001-222799 A 8/2001
JP 2006-220562 A 8/2006
(Continued)

OTHER PUBLICATIONS

International Search Report with English translation and Written Opinion issued in corresponding application No. PCT/JP2019/017348 dated Sep. 3, 2019.

*Primary Examiner* — Shardul D Patel
(74) *Attorney, Agent, or Firm* — Foley & Lardner LLP (57) ABSTRACT

A parking management system is provided that addresses the problem of parking difficulties in auto-valet situations where vehicle size is not taken into account. It includes a target parking position determination unit, a route generation unit, and a vehicle control unit. The determination unit considers parking block sizes, empty vehicle space position, and the own vehicle's size to find a suitable parking spot. The route generation unit creates a guidance route from the entrance to the target parking position. The vehicle control unit autonomously drives the own vehicle along the generated route. The system generates potential routes based on entrance or exit positions and determines a turning point on the route. If the own vehicle can safely navigate the turning point con- (Continued)

sidering parked vehicle sizes and minimum turning radius, that route is selected as the guidance route.

10 Claims, 7 Drawing Sheets

(51) Int. Cl.
*B60W 60/00* (2020.01)
*B60W 30/06* (2006.01)
*G01C 21/34* (2006.01)

(58) Field of Classification Search
CPC .......... B60W 30/0956; G01C 21/3407; G01C 22/00; B62D 15/0285
USPC .......................................................... 701/25
See application file for complete search history.

(56) References Cited

U.S. PATENT DOCUMENTS

| 2018/0046198 | A1 | 2/2018 | Nordbruch |
| 2018/0233033 | A1* | 8/2018 | Nordbruch ............... G08G 1/04 |
| 2019/0322318 | A1 | 10/2019 | Hasejima |
| 2021/0086756 | A1* | 3/2021 | Hasejima ............... B60W 50/14 |

FOREIGN PATENT DOCUMENTS

| JP | 2015-191273 A | | 11/2015 |
| JP | 2015191273 A | * | 11/2015 |
| JP | 2017-102015 A | | 6/2017 |
| JP | 2017-534118 A | | 11/2017 |
| JP | 2018-001979 A | | 1/2018 |
| JP | 2018-034541 A | | 3/2018 |
| JP | 2018-508082 A | | 3/2018 |
| JP | 2018034541 A | * | 3/2018 |

* cited by examiner

PARKING MANAGEMENT SYSTEM, VEHICLE CONTROL DEVICE, AND CONTROL CENTER

TECHNICAL FIELD

The present invention relates to a parking management system that realizes so-called auto-valet parking, in which a vehicle is automatically guided to an empty parking section in a parking lot, and a vehicle control device and a control center included in the system.

BACKGROUND ART

Conventionally, there has been known a parking lot guidance system that guides a driver on a route to an empty parking block in a parking lot.

For example, ABSTRACT of PTL 1 describes a parking lot guidance system in which in order to "realize the parking lot guidance system capable of smoothly guiding a vehicle entering a parking lot to an empty parking block without imposing a burden on a vehicle driver", "a plurality of empty parking blocks in the parking lot is detected, an empty parking block to which the vehicle is guided is selected from the detected empty parking blocks, and a road map in the parking lot and a route P to the selected empty parking block K are displayed on a route guide plate", and discloses a technology that conveys the route to the selected empty parking block to the driver via the road map of the parking lot, a screen in the vehicle, etc.

CITATION LIST

Patent Literature

PTL 1: JP 2001-222799 A

SUMMARY OF INVENTION

Technical Problem

According to PTL 1 described above, by transmitting a route to an empty parking block to a driver in a vehicle entering a parking lot, it is possible to reduce a burden on the driver to search for an empty parking block (also referred to as "empty vehicle space").

However, in PTL 1, the empty parking block and the route are selected without considering specification such as a size or a minimum turning radius of the vehicle. Thus, when the vehicle is large, a designated route may not be passed, or the vehicle may not be parked in a designated empty parking block. In particular, in a case where the technology of PTL 1 is adopted to auto-valet parking for moving to a designated empty parking block regardless of driving of a driver, when a vehicle is large, a designated route may not be passed, or the vehicle may not be parked in the designated empty parking block, so that the vehicle may be a factor in causing a traffic congestion in the parking lot.

Therefore, an object of the invention is to provide a parking management system, a vehicle control device, and a control center capable of selecting an appropriate empty parking block or travel route considering vehicle specifications even when a vehicle is parked in an empty parking block by auto-valet parking.

Solution to Problem

To solve the above-mentioned problem, a parking management system of the invention includes a parked vehicle database that records a size and a position of each parked vehicle in a parking lot, a parking lot map database that records a position and a size of each parking block in the parking lot, a position of an empty vehicle space, a position and a width of each passage, and positions of an entrance and an exit of the parking lot, a vehicle specification database that records a size and a minimum turning radius of an own vehicle, a target parking position determination unit that determines a target parking position based on the size of each parking block and the position of the empty vehicle space acquired from the parking lot map database and the size of the own vehicle acquired from the vehicle specification database, a route generation unit that generates a guidance route from the entrance to the target parking position or a guidance route from a parking position of the own vehicle to the exit, and a vehicle control unit that automatically drives the own vehicle according to the guidance route generated by the route generation unit, and the route generation unit includes a route candidate generation unit that generates a route candidate from the entrance to the target parking position or a route candidate from the parking position of the own vehicle to the exit based on a position of the entrance or the exit acquired from the parking lot map database, and a turning point generation unit that generates a turning point on a route candidate generated by the route candidate generation unit and determines the route candidate as a guidance route when it is determined that the own vehicle is allowed to pass the route candidate by turning back at the turning point based on the size and the position of each parked vehicle acquired from the parked vehicle database and the size and the minimum turning radius of the own vehicle acquired from the vehicle specification database.

Advantageous Effects of Invention

According to the invention, it is possible to determine a target parking position based on vehicle specifications, set a turning point on a guidance route to the target parking position or a parking lot exit based on vehicle specifications, and automatically drive a vehicle according to the guidance route. As a result, it is possible to suppress occurrence of traffic congestion due to stoppage of an own vehicle at the time of entering or exiting a parking lot by automatic driving, and it is possible to improve utilization efficiency of the parking lot.

DESCRIPTION OF EMBODIMENTS

Hereinafter, embodiments of a parking management system of the invention will be described with reference to the drawings.

First Embodiment

First, a first embodiment of a parking management system of the invention will be described with reference to FIG. 1 to FIG. 7.

Figure 1:
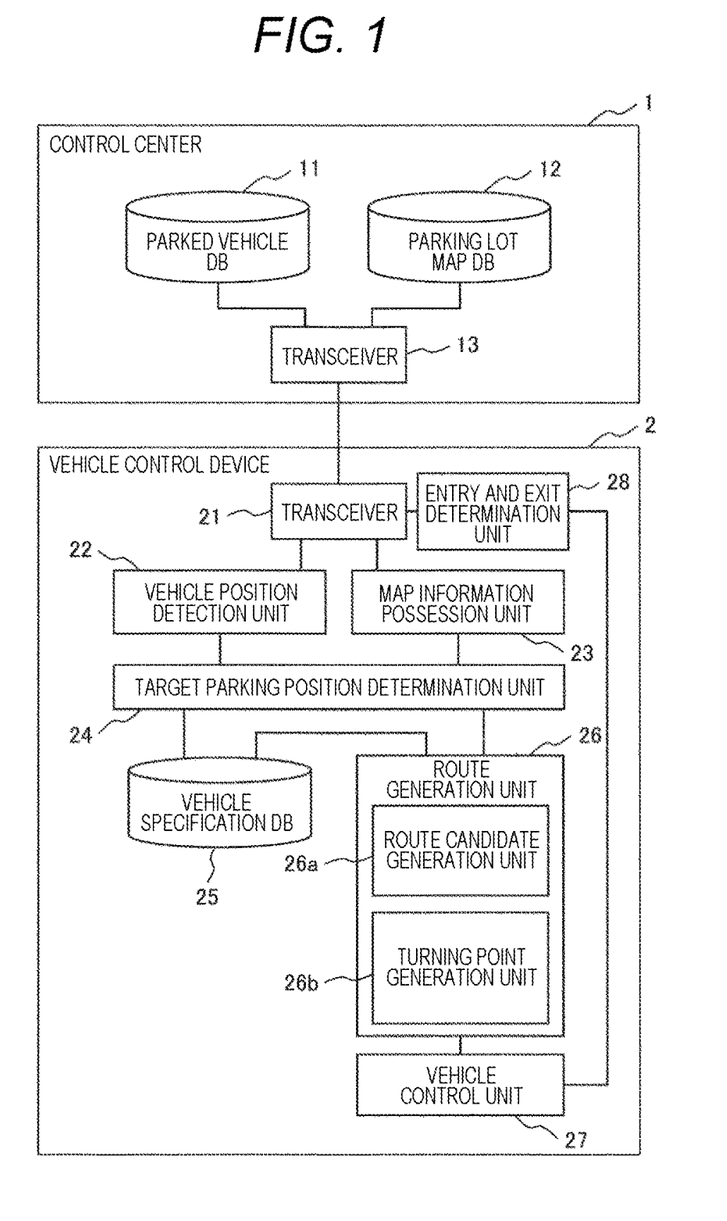
FIG. 1 is a diagram illustrating a functional block of a parking management system of a first embodiment.

FIG. 1 is a functional block diagram of the parking management system of the present embodiment. As illustrated here, the parking management system of the present embodiment includes a control center 1 and a vehicle control device 2, and sends map information and parked vehicle information in a parking lot from the control center 1 to the vehicle control device 2. In the vehicle control device 2, a target parking position is determined based on the information, a guidance route to the target parking position or the parking lot exit is generated, and automatic driving according to the guidance route is realized. Here, the control center 1 may be installed near the parking lot or at a remote location. Further, the vehicle control device 2 is mounted in a vehicle. Note that specifically, each of the control center 1 and the vehicle control device 2 is a computer including hardware such as an arithmetic device such as a CPU, a main storage device such as a semiconductor memory, an auxiliary storage device such as a hard disk, and a communication device. Further, each function described later is implemented by the arithmetic device executing a program loaded in the main storage device while referring to a database recorded in the auxiliary storage device. Hereinafter, description will be given while omitting a well-known technology as appropriate.

The control center 1 provides the data necessary for the vehicle control device 2 to execute automatic driving in the parking lot, and includes a parked vehicle database 11, a parking lot map database 12, and a transceiver 13 as illustrated in FIG. 1.

A size, a parking position, etc. of each vehicle parked in the parking lot is recorded in the parked vehicle database 11. In addition, map information including information such as a position and size of each parking block in the parking lot, a position of an empty vehicle space, a position and width of each passage, and positions of an entrance and an exit of the parking lot are recorded in the parking lot map database 12. The transceiver 13 transmits and receives data to and from the vehicle control device 2 via a wireless network, transmits the information in the parked vehicle database 11 and the information in the parking lot map database 12 to the vehicle control device 2, and receives vehicle specification information (information such as a size and a minimum turning radius of the vehicle), a target parking position of the vehicle, notification of completion of parking and exiting, etc. from the vehicle control device 2.

Meanwhile, the vehicle control device 2 is a device for causing a vehicle equipped with the vehicle control device 2 to execute automatic driving in the parking lot, and is a device that calculates a guidance route from a parking lot entrance to a target parking position, or from a parking position to a parking lot exit, and controls a steering device, a driving device, a braking device, etc. (not illustrated), thereby implementing automatic driving according to the guidance route. As illustrated in FIG. 1, the vehicle control device 2 includes a transceiver 21, a vehicle position detection unit 22, etc., and details of each of the units will be described in sequence below.

The transceiver 21 receives the information in the parked vehicle database 11, the information in the parking lot map database 12, etc. from the control center 1, and transmits the vehicle specification information, the target parking position, the notification of completion of parking and exiting, etc. to the control center 1.

The vehicle position detection unit 22 records positions of other vehicles in the parking lot received from the control center 1, and the map information possession unit 23 records the map information in the parking lot received from the control center 1. In addition, a vehicle specification database 25 records vehicle specification information such as the size or the minimum turning radius of the own vehicle.

A target parking position determination unit 24 searches for empty vehicle spaces where other vehicles are not currently parked from the information of the vehicle position detection unit 22 and the map information possession unit 23, extracts an empty vehicle space having a size that allows parking of the own vehicle from a plurality of empty vehicle spaces searched based on the size of the own vehicle, etc. obtained from the vehicle specification database 25, and determines one of the extracted empty vehicle spaces (for example, an empty vehicle space closest to a current position or an empty vehicle space closest to an entrance of a building) as the target parking position.

A route generation unit 26 generates an optimum guidance route from the current position of the own vehicle to the target parking position based on the size, the minimum turning radius, etc. of the own vehicle obtained from the vehicle specification database 25. A vehicle control unit 27 controls the steering device, the driving device, etc. of the own vehicle according to the determined guidance route to perform auto-valet parking.

Here, as illustrated in FIG. 1, the route generation unit 26 of the present embodiment includes a route candidate generation unit 26a and a turning point generation unit 26b. Details of each of the units will be described below.

First, the route candidate generation unit 26a generates a candidate for a guidance route from the current position of the own vehicle to the target parking position, and determines whether the own vehicle can pass the guidance route candidate based on the information in the vehicle specification database 25 and the map information. This determination is performed based on vehicle specification information such as a total width, a total length, and a minimum turning radius of the own vehicle obtained from the vehicle specification database 25, information such as parking positions, sizes, etc. of other vehicles obtained from the vehicle position detection unit 22, and information such as a road width, a wall, a white line, etc. in the parking lot obtained from the map information possession unit 23 by verifying whether the own vehicle can pass the guidance route candidate without touching the other vehicles, the wall, and the white line. Then, when it is determined that the guidance route candidate is passable, the candidate is output to the vehicle control unit 27 as the guidance route. In this case, the turning point generation unit 26b is not used.

On the other hand, when it is determined that the generated guidance route candidate is impassable, the turning point generation unit 26b generates a turning point on the guidance route candidate, and when a traveling direction of the vehicle is changed at the turning point, it is determined whether the guidance route candidate is passable based on the information in the vehicle specification database 25. When it is determined that the vehicle can pass by turning back, the guidance route candidate including the turning point is output to the vehicle control unit 27 as a guidance route.

In a case where the own vehicle enters the parking lot, when the own vehicle arrives at the target parking position, an entry and exit determination unit 28 determines that automatic driving by the vehicle control unit 27 ends, and transmits a parking completion notification to the control center 1 via the transceiver 21. Note that in a case where the own vehicle exits the parking lot, when the own vehicle arrives at the parking lot exit, it is determined that automatic driving by the vehicle control unit 27 ends, and an exit completion notification is transmitted to the control center 1 via the transceiver 21.

<Entering Operation by Automatic Driving>

Next, a procedure of auto-valet parking in which the vehicle control device 2 automatically guides the own vehicle to the target parking position in the parking lot will be described with reference to a flowchart of FIG. 2.

Auto-valet parking by the vehicle control device 2 is started when the driver notifies the control center 1 of the use of the parking lot by using a mobile terminal, an in-vehicle navigation system, etc. When the own vehicle arrives at a planned parking lot entrance, the vehicle control device 2 receives the information in the parked vehicle database 11 and the parking lot map database 12 from the control center 1. Then, the information from the parked vehicle database 11 is stored in the vehicle position detection unit 22, and the information from the parking lot map database 12 is stored in the map information possession unit 23 (step S1).

Next, the target parking position determination unit 24 searches for an empty vehicle space from the information stored in the vehicle position detection unit 22 (step S2), and determines whether the searched empty vehicle space is a space in which the own vehicle having the size detected from the vehicle specification database 25 can be parked (step S3).

Then, when it is determined that the searched empty vehicle space is smaller than the size of the own vehicle and parking is not allowed, another empty vehicle space is searched. On the other hand, when it is determined that the searched empty vehicle space is wider than the size of the own vehicle and parking is allowed, the empty vehicle space is determined as the target parking position (step S4).

When the target parking position is determined, the route candidate generation unit 26*a* of the route generation unit 26 generates one guidance route candidate from the parking lot entrance to the target parking position (step S5). Note that the guidance route candidate generated here is, for example, a shortest distance route or a route having less traffic. However, the guidance route candidate may be generated based on other criteria. Then, while referring to the specification information and map information of the own vehicle, it is determined whether or not the own vehicle can pass the guidance route candidate to the target parking position without touching the wall, the white line, or another vehicle (step S6). When it is determined that the guidance route candidate is a passable guidance route, the guidance route candidate is determined as the guidance route (step S9).

On the other hand, when it is determined that the guidance route candidate is impassable, the turning point generation unit 26*b* of the route generation unit 26 generates a turning point at a position corresponding to an intersection on the route candidate, and regenerates a guidance route candidate whose vehicle direction is changed from a forward direction to a backward direction at the turning point (step S7). Then, it is determined whether passing is allowed in the case of the route candidate including the turning point (step S8), and when it is determined that passing is allowed, the route candidate including the turning point is determined as the guidance route (step S9). Note that when it is determined that passing is not allowed in step S8, the process returns to step S2, and another empty vehicle space is searched for.

When the route generation unit 26 determines the guidance route to the target parking position, the vehicle control unit 27 controls a speed, a steering angle, etc. of the own vehicle according to the determined guidance route to perform auto-valet parking (step S10). Then, when parking at the target parking position has been completed (step S11), the entry and exit determination unit 28 transmits the parking completion notification, the parking position of the own vehicle, the size of the own vehicle, etc. via the transceiver 21 to update the data in the parked vehicle database 11 and the parking lot map database 12 held by the control center 1.

Next, a behavior of the own vehicle when the auto-valet parking of the present embodiment is executed will be specifically described with reference to FIGS. 3 to 6.

Figure 2:
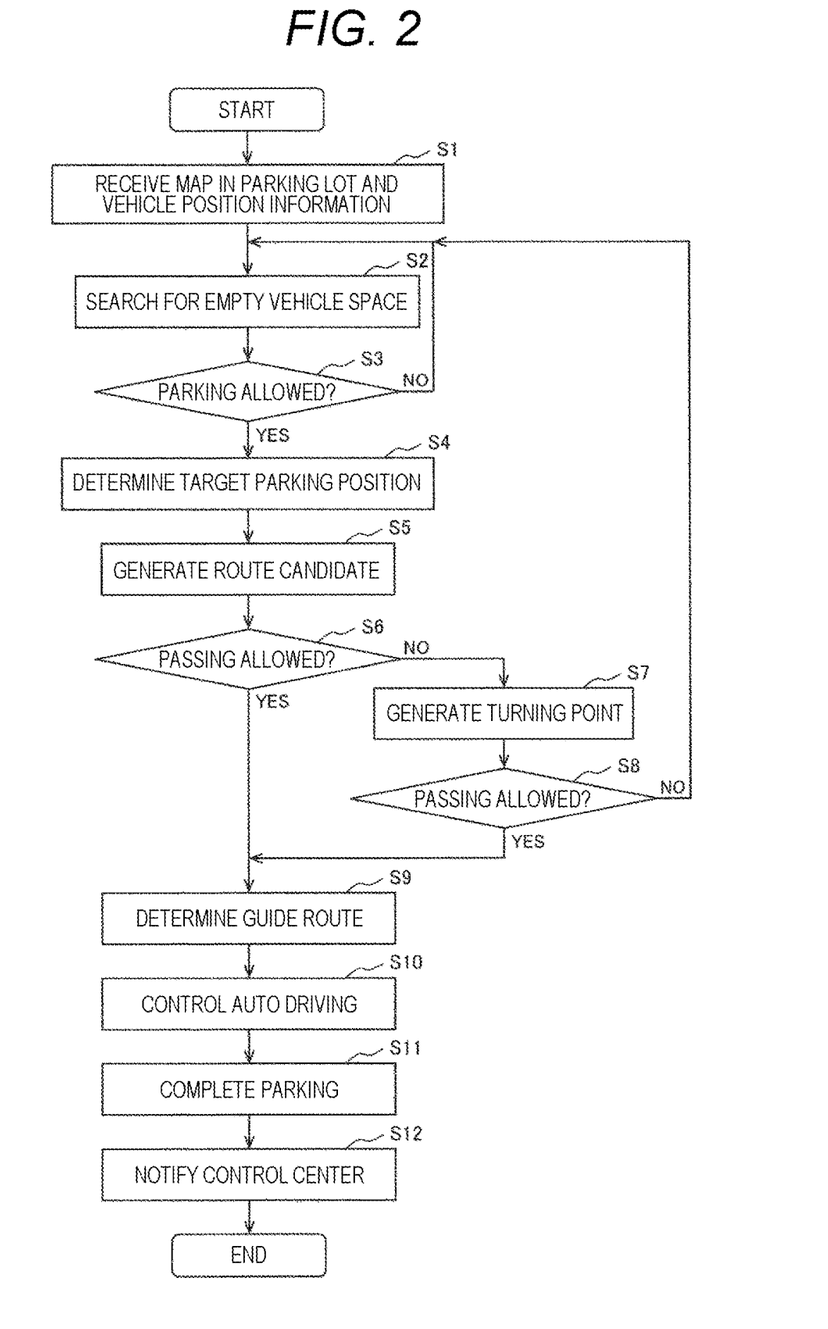
FIG. 2 is a flowchart for description of a procedure for guiding an own vehicle to a target parking position.
Figure 3:
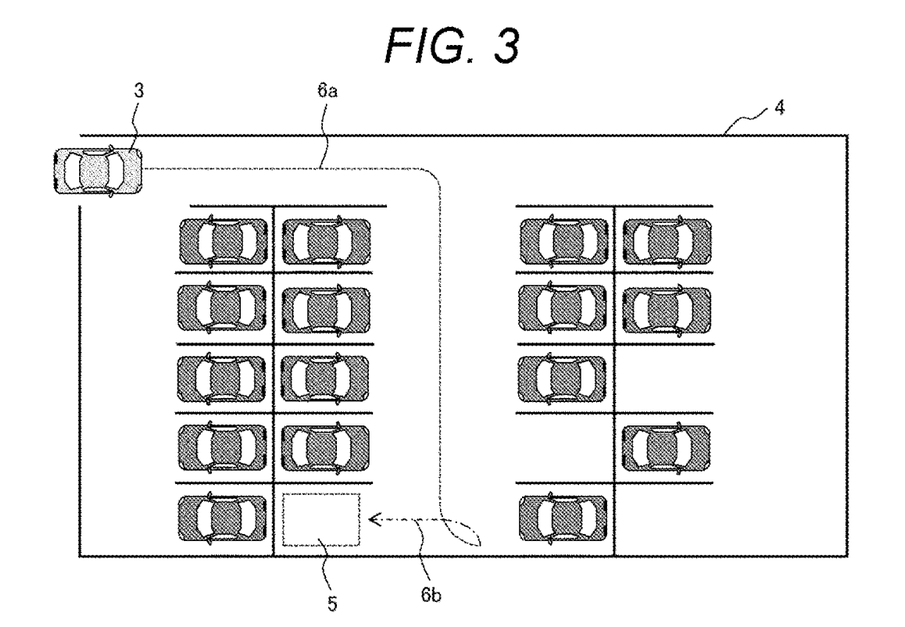
FIG. 3 is a diagram illustrating an example of guidance route calculation when an end of the parking lot is set as the target parking position.

FIG. 3 is a diagram illustrating an example of auto-valet parking in which an own vehicle 3 is parked at a target parking position 5 in a parking lot 4 by automatic driving, and illustrates a situation where there is no obstacle to forward driving to the vicinity of the target parking position 5 due to the fact that the own vehicle 3 is small or a minimum turning radius is small with respect to a passage width. Adopting such a guidance route corresponds to a case where it is determined in step S6 of FIG. 2 that the guidance route candidate generated by the route candidate generation unit 26*a* is passable, and the turning point generation unit 26*b* does not generate a turning point. In this case, in step S9, the guidance route candidate generated by the route candidate generation unit 26*a* is adopted as a guidance route 6 without change. As a result, auto-valet parking is executed on a route to drive on a forward guidance route 6*a* indicated by a broken line from a parking lot entrance to the vicinity of the target parking position 5 and drive on a backward guidance route 6*b* indicated by an alternate long and short dash line to the target parking position 5 therefrom.

Figure 4:
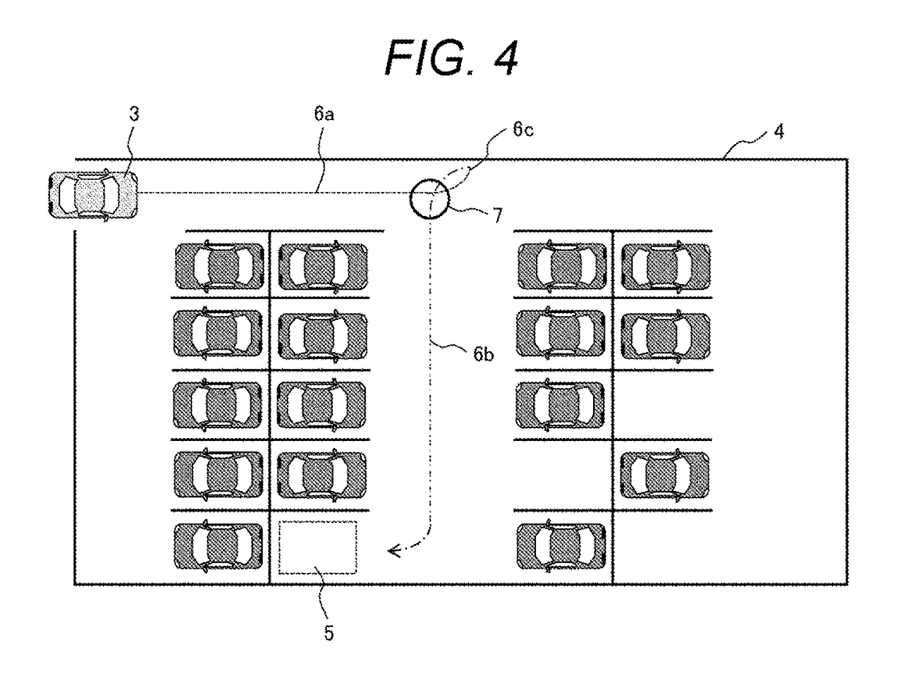
FIG. 4 is a diagram illustrating an example of guidance route calculation when an end of the parking lot is set as the target parking position.

Meanwhile, as in FIG. 3, FIG. 4 is a diagram illustrating an example in which the own vehicle 3 is parked at the target parking position 5 in the parking lot 4 by automatic driving. However, this example illustrates a situation where there is an obstacle to forward driving to the vicinity of the target parking position 5 or conversion of the traveling direction in the vicinity of the target parking position 5 due to the fact that the own vehicle 3 is large or the minimum turning radius is large with respect to the passage width. Adopting such a guidance route corresponds to a case where it is determined that the guidance route candidate generated by the route candidate generation unit 26*a* is impassable in step S6 of FIG. 2, the turning point generation unit 26*b* generates a turning point 7 on the intersection in step S7, and it is determined that the guidance route candidate is passable by using the turning point 7 in step S8. In this case, in step S9, a route obtained by adding the turning point 7 generated by the turning point generation unit 26*b* to the guidance route candidate generated by the route candidate generation unit 26*a* is adopted as the guidance route 6. As a result, auto-valet parking is executed on a route to drive on the forward guidance route 6a indicated by the broken line from the parking lot entrance to the turning point 7, drive on a turn-back guidance route 6c for changing the traveling direction of the own vehicle from the forward direction to the back ward direction at the turning point 7, and drive on the backward guidance route 6b indicated by the alternate long and short dash line to the target parking position 5 therefrom.

Figure 5:
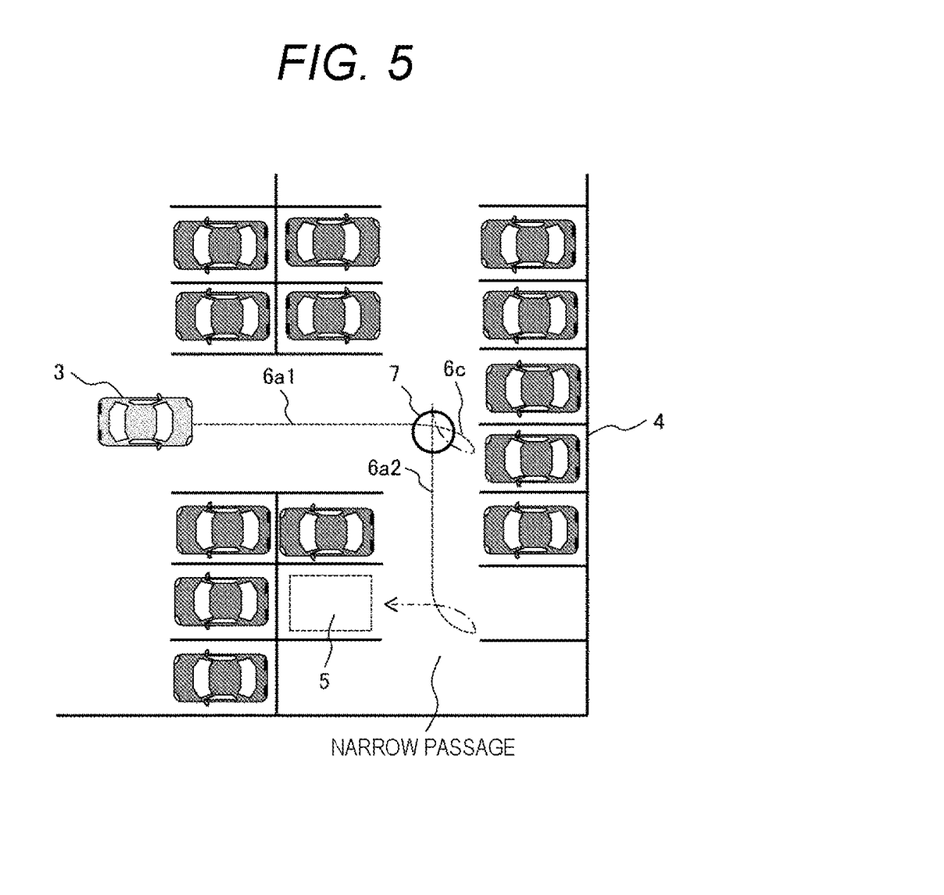
FIG. 5 is a diagram illustrating an example of guidance route calculation when the vehicle passes through a narrow passage in a parking lot.

FIG. 5 is a diagram illustrating another example in which the own vehicle 3 is parked at a target parking position 5 in the parking lot 4 by automatic driving. This example illustrates a situation in which the vehicle makes a right turn when moving to the target parking position 5, and turns at a position smaller than the minimum turning radius of the vehicle, and thus, a turn is required. The turning point 7 in this example is generated by the same procedure as that in FIG. 4. However, a purpose thereof is different. That is, while the turning point 7 of FIG. 4 is for changing the traveling direction of the own vehicle 3, the turning point 7 of FIG. 5 is for implementing a right/left turn in a narrow passage. For example, auto-valet parking is executed on a route to move forward on a forward guidance route $6a_1$ from the parking lot entrance to the turning point 7, turn right without changing the traveling direction of the vehicle by turning back as on the turn-back guidance route 6c at the turning point 7, and move forward on a guidance route $6a_2$ from the turning point 7 to the vicinity of the target parking position 5.

Figure 6:
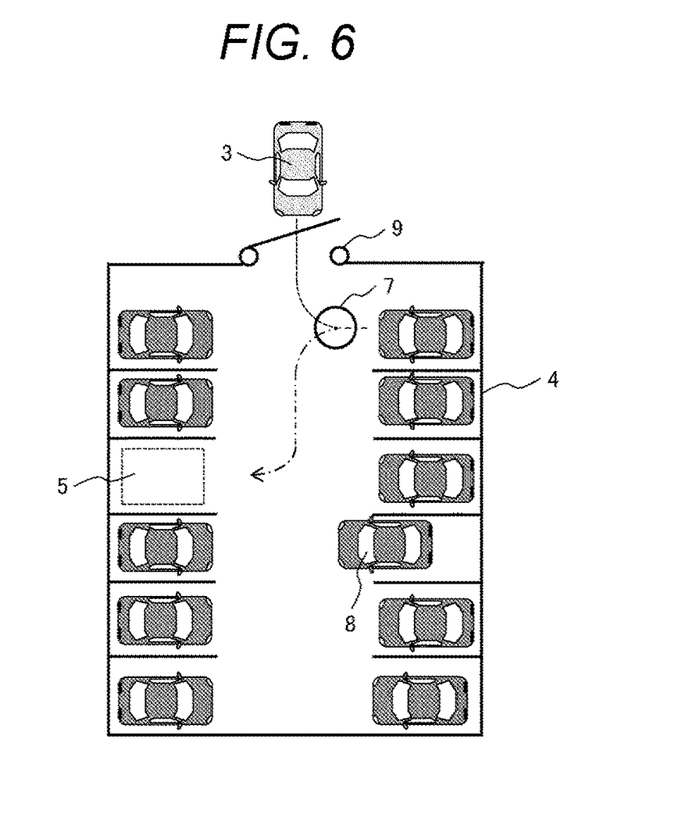
FIG. 6 is a diagram illustrating an example of guidance route calculation when the vehicle is parked in a small parking lot.

Further, FIG. 6 is a diagram illustrating another example in which the own vehicle 3 is parked at a target parking position 5 in the parking lot 4 by automatic driving. This example is a situation where a parked vehicle 8 is parked with a large protrusion, and thus there is a possibility that a front right side of the own vehicle 3 and a front right side of the parked vehicle 8 may come into contact with each other in a normal guidance route that changes direction near the target parking position 5. Even in such a case, when the control center 1 notifies in advance that a parking position of the parked vehicle 8 is abnormal, it is possible to implement auto-valet parking to the target parking position 5 using a guidance route not touching the parked vehicle 8 by generating a turning point 7 at a position immediately after passing through a gate 9 at the parking lot entrance and changing the traveling direction of the own vehicle 3 from the forward direction to the backward direction at the turning point 7.

<Exiting Operation by Automatic Driving>

Next, a description will be given of a procedure when the own vehicle 3 parked in a parking block is automatically driven to the parking lot exit by the vehicle control device 2 with reference to a flowchart of FIG. 7.

Figure 7:
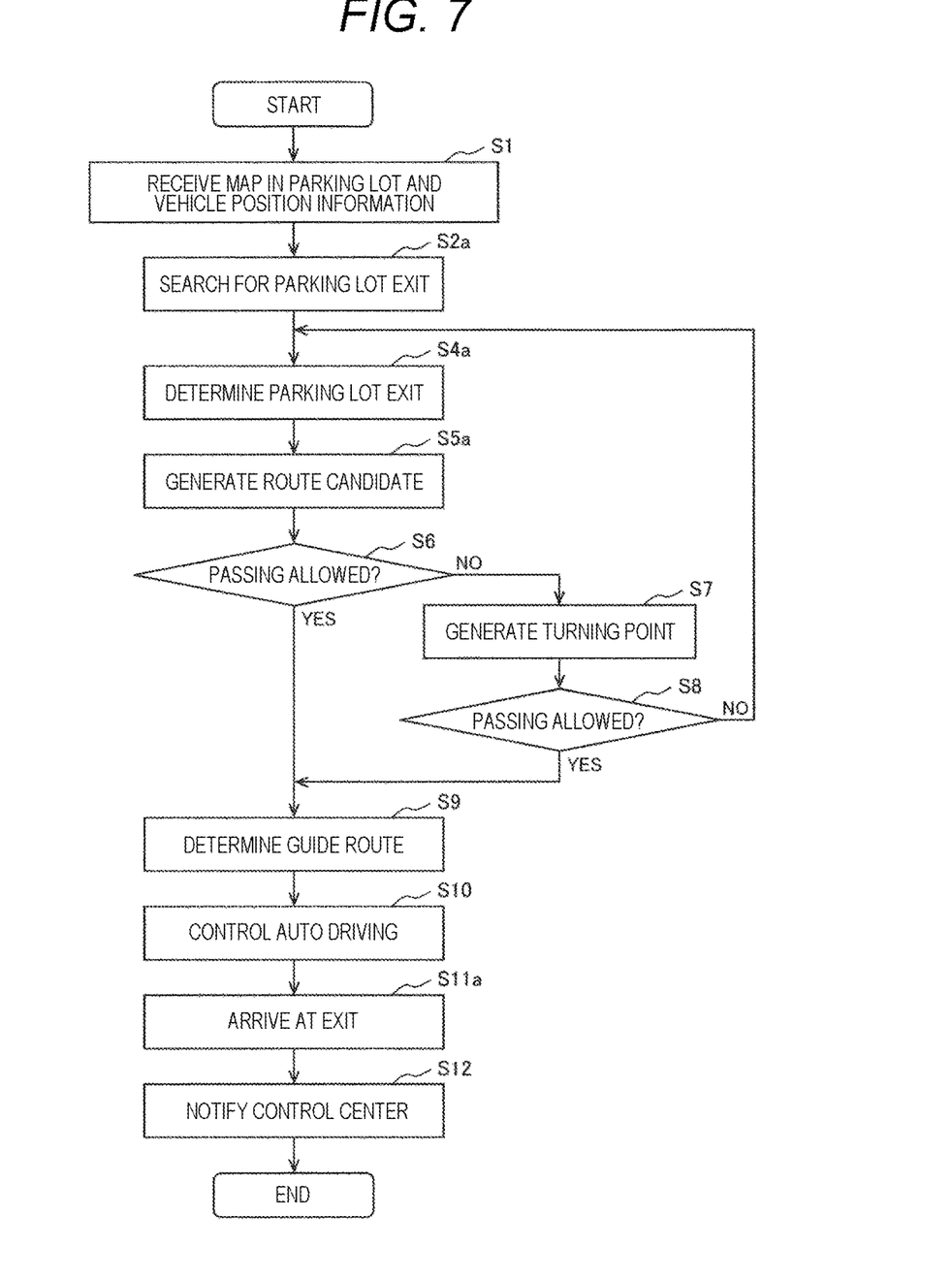
FIG. 7 is a flowchart for description of a procedure for guiding the own vehicle to a parking lot exit.

Similarly to the auto-valet parking of FIG. 2, an exiting operation illustrated in FIG. 7 is started when the driver notifies the control center 1 of exiting using a mobile terminal, etc. A major difference between the auto-valet parking and the exiting operation is that a destination of the own vehicle 3 is not the empty vehicle space but the parking lot exit. Therefore, in FIG. 7, steps S2a, S4a, S5a, and S11a, which will be described later, are executed instead of steps S2 to S5 and S11 of FIG. 2.

That is, in step S2a, the route generation unit 26 acquires the position information of the parking lot exit from the map information holding unit 23. Here, when a plurality of parking lot exits is present, position information of each of the parking lot exits is acquired. Then, in step S4a, a parking lot exit closest to a current parking position of the own vehicle 3 or a most suitable parking lot exit to be headed to a next destination is selected, and in step S5a, a guidance route candidate from the current parking position to the selected parking lot exit is generated. When the own vehicle 3 arrives at the parking lot exit through processing of step S6 to step S10 described above, the entry and exit determination unit 28 transmits an exiting completion notification and a parking block position from which the own vehicle 3 exits via the transceiver 21 to update the data in the parked vehicle database 11 and the parking lot map database 12 held by the control center 1 in step S11a.

According to the parking management system of the present embodiment described above, it is possible to determine a target parking position based on vehicle specifications, set a turning point on a guidance route to the target parking position or a parking lot exit based on vehicle specifications, and automatically drive a vehicle according to the guidance route. As a result, it is possible to suppress occurrence of traffic congestion due to stoppage of an own vehicle at the time of entering or exiting a parking lot by automatic driving, and it is also possible to improve utilization efficiency of the parking lot.

Second Embodiment

Next, a parking management system according to a second embodiment of the invention will be described with reference to FIG. 8. Note that repeated description of common points with the first embodiment will be omitted.

Figure 8:
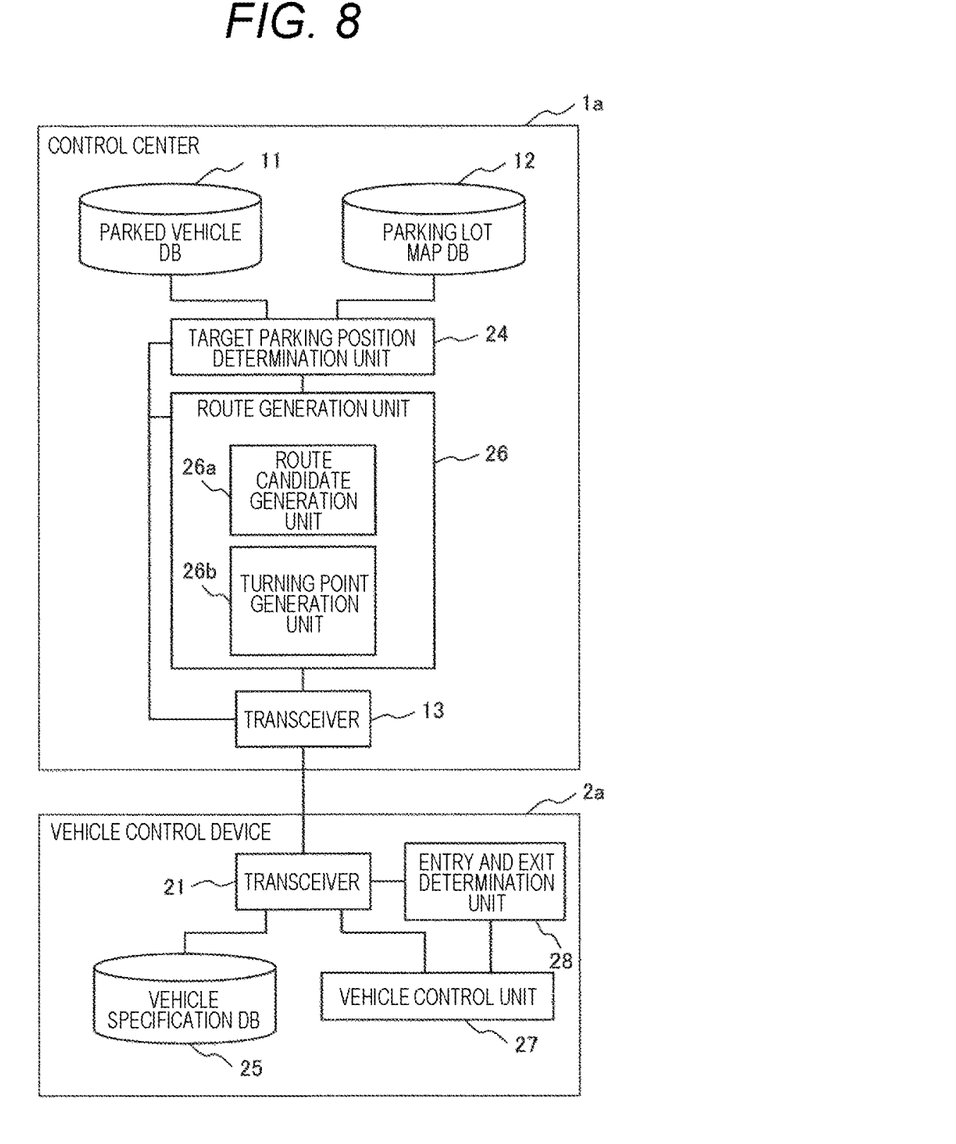
FIG. 8 is a diagram illustrating a functional block of a parking management system of a second embodiment.

FIG. 8 is a functional block diagram of a control center 1a and a vehicle control device 2a in the parking management system of the present embodiment. As is clear from the comparison with FIG. 1 of the first embodiment, in the present embodiment, the target parking position determination unit 24 and the route generation unit 26 are provided in the control center 1a, so that the vehicle position detection unit 22, the map information possession unit 23, the target parking position determination unit 24, and the route generation unit 26 are omitted in the vehicle control device 2a. As a result of adopting such a configuration, a guidance route determination process in step S9 of FIG. 2 or FIG. 7 is executed by the control center 1a that has received data from the vehicle specification database 25 of the vehicle control device 2a, and the vehicle control unit 27 of the vehicle control device 2a controls the own vehicle 3 according to the guidance route received from the control center 1a.

In the case of adopting the configuration of the present embodiment, the behavior of the own vehicle 3 at the time of entering and exiting by automatic driving is basically the same as that described in the first embodiment, and thus similar effects can be obtained. However, there are advantages listed below.

That is, in the first embodiment, since the vehicle control device 2 of each vehicle independently determines the target parking position, the guidance route, etc., the respective vehicles may determine the same target parking position, or the parking routes of the respective vehicles may be concentrated in a specific passage in some cases. However, in the present embodiment, since the control center 1a centrally controls the target parking position, the guidance route, etc. of each vehicle, it is possible to more effectively suppress the occurrence of traffic congestion in the parking lot by dispersing the target parking positions of the respective vehicles, or dispersing the passages to be passed.

In addition, in the first embodiment, it is necessary to implement the target parking position determination unit and the route generation unit 26 by a relatively inexpensive and low-speed arithmetic device that can be mounted on each vehicle. However, in the present embodiment, the target parking position determination unit 24 and the route generation unit 26 are implemented by a relatively effective and high-speed arithmetic device installed in the control center 1a. As a result, the target parking position and the guidance route can be determined more rapidly and more accurately.

Furthermore, when the control center 1a can detect availability of each parking block one by one, a new guidance route having a newly generated empty vehicle space as a target parking position may be provided to a vehicle automatically driving on the guidance route, so that it is possible to shorten a time required for auto-valet parking.

REFERENCE SIGNS LIST 1, 1a control center
11 parked vehicle database
12 parking lot map database
13 transceiver
2, 2a vehicle control device
21 transceiver
22 vehicle position detection unit
23 map information possession unit
24 target parking position determination unit
25 vehicle specification database
26 route generation unit
26a route candidate generation unit
26b turning point generation unit
27 vehicle control unit
28 entry and exit determination unit
3 own vehicle
4 parking lot
5 target parking position
6 guidance route
6a forward guidance route
6b backward guidance route
6c turn-back guidance route
7 turning point
8 parked vehicle
9 gate

The invention claimed is:

1. A parking management system comprising:
a parked vehicle database that records a size and a position of each parked vehicle in a parking lot;
a parking lot map database that records a position and a size of each parking block in the parking lot, a position of an empty vehicle space, a position and a width of each passage, and positions of an entrance and an exit of the parking lot;
a vehicle specification database that records a size and a minimum turning radius of an own vehicle;
a target parking position determination unit that determines a target parking position based on the size of each parking block and the position of the empty vehicle space acquired from the parking lot map database and the size of the own vehicle acquired from the vehicle specification database;
a route generation unit that generates a guidance route from the entrance to the target parking position or a guidance route from a parking position of the own vehicle to the exit; and
a vehicle control unit that automatically drives the own vehicle according to the guidance route generated by the route generation unit,
wherein the route generation unit includes:
a route candidate generation unit that generates a route candidate from the entrance to the target parking position or a route candidate from the parking position of the own vehicle to the exit based on a position of the entrance or the exit acquired from the parking lot map database, and
a turning point generation unit that generates a turning point on the route candidate generated by the route candidate generation unit and determines the route candidate as the guidance route when it is determined that the own vehicle is allowed to pass the route candidate by turning back at the turning point based on the size and the position of each parked vehicle acquired from the parked vehicle database and the size and the minimum turning radius of the own vehicle acquired from the vehicle specification database.

2. The parking management system according to claim 1, comprising:
a control center including the parked vehicle database, the parking lot map database, and a first transceiver; and
a vehicle control device including the vehicle specification database, the target parking position determination unit, the route generation unit, the vehicle control unit, and a second transceiver.

3. The parking management system according to claim 1, comprising:
a control center including the parked vehicle database, the parking lot map database, the target parking position determination unit, the route generation unit, and a first transceiver; and
a vehicle control device including the vehicle specification database, the vehicle control unit, and a second transceiver.

4. The parking management system according to claim 3, wherein when a parking position of each vehicle recorded in the parked vehicle database is updated, the route generation unit redetermines the guidance route.

5. The parking management system of claim 1, wherein, in response to a parked vehicle protruding abnormally from a second parking position located proximate the target parking position, the turning point generation unit generates the turning point at a position immediately inside the entrance of the parking lot.

6. A vehicle control device for automatically driving a vehicle according to a guidance route generated based on map information of a parking lot, the vehicle control device comprising:
a vehicle specification database that records a size and a minimum turning radius of an own vehicle;
a target parking position determination unit that determines a target parking position based on the size of each parking block and the position of an empty vehicle space acquired from a parking lot map database and the size of the own vehicle acquired from the vehicle specification database;
a route candidate generation unit that generates a candidate for the guidance route based on the map information and specification information of the vehicle; and
a turning point generation unit that sets a turning point on the guidance route generated by the route candidate generation unit.

7. The vehicle control device according to claim 6, wherein the turning point generation unit generates the turning point at an intersection position or a parking block position included in the map information.

8. A control center for transmitting a guidance route generated based on map information of a parking lot to a vehicle control device for automatically driving a vehicle to a target parking position, the control center comprising:
- a route candidate generation unit that generates a route candidate for the guidance route to the target parking position based on the map information and a specification information of the vehicle; and
- a turning point generation unit that sets a turning point on the guidance route generated by the route candidate generation unit; and
- a transceiver configured to receive a parking completion notification upon the vehicle parking at the target parking position.

9. The control center according to claim 8, wherein the turning point generation unit generates the turning point at an intersection position or a parking block position included in the map information.

10. The control center of claim 8, wherein the route candidate generation unit generates the route candidate based on a second target parking position of a second vehicle.

* * * * *